United States Patent
Potenza et al.

(10) Patent No.: US 7,160,933 B2
(45) Date of Patent: Jan. 9, 2007

(54) STABLE INK JET INK COMPOSITION AND PRINTING METHOD

(75) Inventors: Joan C. Potenza, Rush, NY (US); Charles E. Heckler, Rush, NY (US); Xiaoru Wang, Rochester, NY (US); Huijuan D. Chen, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 269 days.

(21) Appl. No.: 10/393,061

(22) Filed: Mar. 20, 2003

(65) Prior Publication Data

US 2004/0186198 A1    Sep. 23, 2004

(51) Int. Cl.
- C09D 11/10    (2006.01)
- C08K 5/3415   (2006.01)
- C08K 5/3445   (2006.01)
- C07D 403/02   (2006.01)

(52) U.S. Cl. .................... 523/160; 523/205; 524/94
(58) Field of Classification Search ........... 523/160, 523/161; 106/31.45, 31.48, 31.49, 31.5; 524/91, 92, 94, 106, 385, 394, 430, 445, 524/492
See application file for complete search history.

(56) References Cited

U.S. PATENT DOCUMENTS

| | | | |
|---|---|---|---|
| 4,680,332 A * | 7/1987 | Hair et al. .................. | 524/377 |
| 5,958,998 A | 9/1999 | Foucher et al. | |
| 6,031,019 A * | 2/2000 | Tsutsumi et al. ........... | 523/160 |
| 6,200,371 B1 | 3/2001 | Holbrook et al. | |
| 6,464,767 B1 | 10/2002 | Evans et al. | |
| 6,468,338 B1 | 10/2002 | Evans et al. | |
| 6,727,318 B1 * | 4/2004 | Mathauer et al. .......... | 524/801 |
| 6,780,901 B1 * | 8/2004 | Endo et al. ................. | 523/160 |
| 6,867,251 B1 * | 3/2005 | Wang et al. ................ | 524/190 |
| 2003/0119938 A1 * | 6/2003 | Wang et al. ................ | 523/160 |
| 2004/0068029 A1 * | 4/2004 | Wang et al. ................ | 523/160 |

FOREIGN PATENT DOCUMENTS

| | | |
|---|---|---|
| EP | 1 052 274 A | 11/2000 |
| EP | 1 197 535 A | 4/2002 |
| EP | 1 245 588 A | 10/2002 |
| EP | 1 245 589 A | 10/2002 |
| EP | 1 283 249 A | 2/2003 |
| JP | 297126 A | 10/2000 |
| WO | WO 98/14524 | 4/1998 |

* cited by examiner

*Primary Examiner*—Callie Shosho
(74) *Attorney, Agent, or Firm*—Sarah Meeks Roberts; Kathleen Neuner Manne

(57) ABSTRACT

This invention relates to an ink composition (and a method of printing therewith) comprising water, a humectant, and polymer-dye particles, wherein said polymer-dye particles comprise a colorant phase containing a water insoluble dye of formula (I), and a polymer phase, said particles being associated with a co-stabilizer

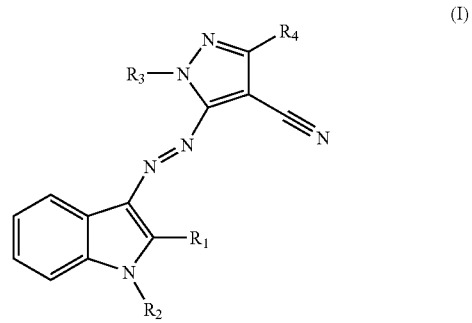

(I)

wherein $R_1$ is a substituent as described in the application; $R_2$ is a substituent as described in the application; $R_3$ has a Pi of 0 to 1.5; and $R_4$ has a Pi of greater than or equal to 0.6.

37 Claims, No Drawings

STABLE INK JET INK COMPOSITION AND PRINTING METHOD

FIELD OF THE INVENTION

This invention relates to ink jet ink compositions comprising polymer-dye particles comprising specific water insoluble dyes. It further relates to an ink jet printing method using said ink jet ink compositions.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging.

In ink jet recording processes, it is necessary that the inks being used meet various performance requirements. Such performance requirements are generally more stringent than those for other liquid ink applications, such as for writing instruments (e.g., a fountain pen, felt pen, etc.). In particular, the following conditions are generally required for inks utilized in ink jet printing processes:
(1) The ink should possess physical properties such as viscosity, surface tension, and electric conductivity matching the discharging conditions of the printing apparatus, such as the driving voltage and driving frequency of a piezoelectric electric oscillator, the form and material of print head orifices, and the diameter of the orifices;
(2) The ink should be capable of being stored for a long period of time without causing clogging of print head orifices during use;
(3) The ink should be quickly fixable onto recording media, such as paper, film, etc., such that the outlines of the resulting ink dots are smooth and there is minimal blotting of the dotted ink;
(4) The printed image should be of high quality, such as having a clear color tone, high density, high gloss, and high color gamut;
(5) The printed image should exhibit excellent water fastness (water resistance) and lightfastness (light resistance) and stability to atmospheric ozone;
(6) The printed (ink) images should have good adhesion to the surface of image receiving elements and should be durable and highly resistant to physical and mechanical scratches or damages;
(7) The ink should not chemically attack, corrode, or erode surrounding materials such as the ink storage container, print head components, orifices, etc;
(8) The ink should not have an unpleasant odor and should not be toxic or inflammable; and
(9) The ink should exhibit low foaming and high pH stability characteristics.

The inks used in various ink jet printers can be classified as either dye-based or pigment-based. Pigment-based inks have some deficiencies. For example, pigment-based inks interact differently with specially coated papers and films such as transparent films used for overhead projection and glossy papers or opaque white films used for high quality graphics and pictorial output. This results in images that have poor dry and wet adhesion properties and that can be easily smudged.

Another deficiency from which pigmented inks suffer is their poor storage stability due to the presence of a water-miscible organic solvent. Water-miscible organic solvents are used to adjust ink rheology, to maximize ink firability, and re-runability. These solvents prevent ink from drying in a printing head and lower ink surface tension to minimize the effect of air-entrapment in an ink formulation. Such air entrapment generates air bubbles which can seriously affect the head performance. Unfortunately, these water-miscible organic solvents can also have a negative effect on the colloidal stability of pigment particles in an ink formulation.

A dye is a colorant which is molecularly dispersed or solvated by a carrier medium. The carrier medium can be a liquid or a solid at room temperature. Known ink jet inks generally comprise a water soluble dye which is soluble in an ink vehicle such as water or a mixture comprising water and a known water soluble or water miscible organic solvent. Inks comprising these soluble dyes may exhibit many problems, such as low optical densities on plain paper, poor water fastness, poor ozone and lightfastness, clogging of the jetting channels as a result of solvent evaporation and changes in the solubility of the dyes, dye crystallization and ink bleeding. One limitation is that many ink formulations exist and many types of media are available, and dye performance can vary greatly as a function of these two variables. Dyes are degraded by ozone and light and their stability with regard to these two agents differs depending on media and ink composition. The yellow dyes currently in commercial aqueous ink formulations are less than optimal in one property or another. They are used because they achieve an acceptable but not superior balance of features. Some examples of such dyes are Direct yellow 132 (CAS 10114-86-0) and Direct yellow 86 (CAS 50295-42-3), which have good stability toward ozone and light but has a less than optimal hue; and acid yellow 23 (CAS 1934-21-0) and acid yellow 17 (CAS 6359-98-4) which have good hue, ozone fastness but poor light stability. U.S. Pat. Nos. 6,468,338 and 6,464,767 describe improved water-soluble dyes, but such dyes are still somewhat limited with regard to ozone stability.

Oil soluble (water insoluble) dyes have been studied to address some of the above concerns. Some inks use organic solvents, but such inks have environmental considerations. Water-based oil soluble dye inks have the advantages of low pollution, low price, and good quality. It is difficult, however, to form a stable dispersion of oil soluble dye in water media. WO 98/14524 and U.S. application Ser. No. 10/046,888 filed Jan. 15, 2002 disclose oil soluble colorants that have been dissolved in organic solvents and added to aqueous polymer latexes slowly under agitation. After mixing, the organic solvent is evaporated and the colorant is loaded to the polymer particles. The mixture is used to formulate ink jet inks with the addition of water, humectants, and some other additives. U.S. Pat. No. 5,958,998 discloses an ink composition containing an oil soluble colorant. The composition is made by flushing pigment into a sulfonated polyester resin having a degree of sulfonation of about 2.5 to about 20 mol percent; dispersing the pigmented polyester resin in water at a temperature of from about 40° C. –95° C., and thereafter separating and mixing. The dispersing is done by a shearing device operating at speeds of 100 to 5000 revolutions which yields stable pigmented submicron sized particles of from about 5 to about 150 nanometers. However, the amount of colorant that may be loaded in the polymer is limited.

JP 00297126A discloses a process for making an ink composition wherein polymer-colorant particles are prepared using a batch emulsion polymerization process employing colorant, monomers, and an initiator. This process, however, involves more micelle particle nucleation and polymer particles are produced. When formulated into an ink jet ink, the presence of free polymers (both polymer particles and water-soluble polymers) can significantly increase ink viscosity, decrease ink storage stability, cause premature printing head failure, and generate image defects.

U.S. applications Ser. Nos. 10/020,694 and 10/017,729, both filed on Dec. 14, 2001, describe particle dispersions and ink jet ink compositions that have improved stability over those prepared by the prior art; there is still a need, however, for colorant particle dispersions that have improved compatibility with water-soluble organic solvents and improved stability in an ink jet composition. There is further a need for additional ink compositions which, when printed, provide images on the surface of an ink jet recording element having improved image quality and improved physical durability such as scratch and smudging resistance. There is a continuing need to develop new water resistant dye-based inks and to improve the existing inks. More specifically, there is a need to develop inks that provide high quality prints on a wide variety of recording media, including plain paper. Particularly, there is a great need to develop dye-based inks which have high optical densities on receivers, and also superior light and ozone fastness and colorfastness independent of media and ink formulation. These and other needs may be achievable in embodiments of the present invention.

SUMMARY OF THE INVENTION

This invention provides an ink composition comprising water, a humectant, and polymer-dye particles, wherein said polymer-dye particles comprise a colorant phase containing a water insoluble dye of formula (I), and a polymer phase, said particles being associated with a co-stabilizer

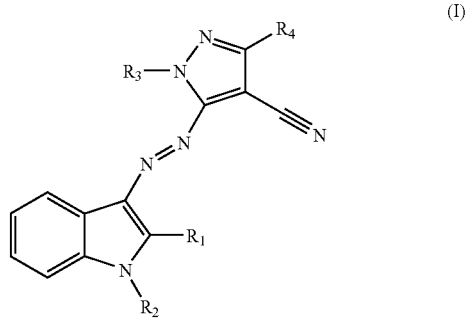

(I)

$R_1$ represents hydrogen, halogen, a substituted or unsubstituted alkyl, alkenyl or alkynyl group, a substituted or unsubstituted allyl group, a substituted or unsubstituted aryl group, a substituted or unsubstituted heterocyclic group or polyoxyalkylene group; a cyano, carboxy, acyl, carboxyalkyl, nitro, sulfo, or amino group, a substituted or unsubstituted alkoxy group, a substituted or unsubstituted aryloxy group, a substituted or unsubstituted alkoxy- or aryloxy-carbonyl group, a ureido group, a carbamoyl group, a substituted or unsubstituted alkyl-, arylalkyl-, aryl-, diaryl- or dialkyl-carbamoyl group, a sulfamoyl group, a substituted or unsubstituted alkyl-, arylalkyl-, aryl-, diaryl- or dialkyl-sulfamoyl group, a sulfonyl group, an acylamino group, a sulfonylamino group, a substituted or unsubstituted alkyl-, aralkyl-, aryl-, diaryl- or dialkyl-amino group; a substituted or unsubstituted heteroalkyl group, or an acyl group;

$R_2$ represents hydrogen, a substituted or unsubstituted alkyl, alkenyl or alkynyl group, a substituted or unsubstituted allyl group, a substituted or unsubstituted aryl group, a substituted or unsubstituted heterocyclic group or polyoxyalkylene group, a substituted or unsubstituted carboxyalkyl group, a substituted or unsubstituted acyl, amido or sulfo group, or a substituted or unsubstituted alkoxy- or aryloxy-carbonyl group;

$R_3$ has a Pi of 0 to 1.5; and $R_4$ has a Pi of greater than or equal to 0.6.

In one embodiment the polymer-dye particles are made by a process comprising, in order:

I) forming a colorant mixture comprising a water insoluble dye of formula (I) and an organic medium containing at least one ethylenically-unsaturated monomer;

II) combining said colorant mixture with an aqueous mixture comprising a surfactant and a co-stabilizer to form a colorant mixture/aqueous mixture;

III) causing the colorant mixture/aqueous mixture to form a stable aqueous droplet mixture via strong agitation; and IV) initiating polymerization to form composite polymer-dye particles comprising a colorant phase and a polymer phase;

wherein an addition polymerization initiator is added prior to initiating polymerization.

This invention further provides an ink jet printing method, comprising the steps of:

A) providing an ink jet printer that is responsive to digital data signals;

B) loading said printer with an ink jet recording element comprising a support having thereon an image-receiving layer;

C) loading said printer with an ink jet ink composition comprising water, a humectant, and polymer-dye particles, wherein said polymer-dye particles comprise a colorant phase containing a water insoluble dye of formula (I) and a polymer phase, said particles being associated with a co-stabilizer; and D) printing on said image-receiving layer using said ink jet ink composition in response to said digital data signals.

The final composite polymer-dye particles utilized in the invention have better stability than those prepared by the prior art. The particles are also more stable during the manufacturing process. An ink formulated with such particles utilizing the specific dye of the invention has improved ozone stability, colloid stability, and good resistance to abrasion regardless of the media. The dyes utilized in this invention are easily synthesized by known methods and methods described herein, have superior hue and lightfastness and good stability toward ozone when formulated according to the method of this invention. The stability of the final image is independent of the nature of the printing media.

DETAILED DESCRIPTION OF THE INVENTION

In accordance with the present invention, a colorant mixture is formed which comprises a water insoluble dye of formula (I) and an organic medium comprising ethylenically-unsaturated monomers. The solubility of the water insoluble dye used in the present invention should be less than 1 g/L in water at 25° C., and more preferably less than 0.5 g/L in water at 25° C. Generally the water insoluble dye is dissolved at room temperature in an organic medium containing ethylenically-unsaturated monomers to form the colorant mixture. The water insoluble dyes utilized in the invention are represented by formula (I)

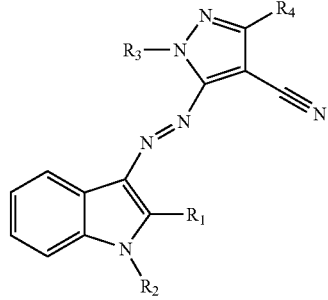

(I)

$R_1$ represents hydrogen, halogen, a substituted or unsubstituted alkyl, alkenyl or alkynyl group, a substituted or unsubstituted allyl group, a substituted or unsubstituted aryl group, a substituted or unsubstituted heterocyclic group, preferably heteroaryl, or polyoxyalkylene group; a cyano, carboxy, acyl, carboxyalkyl, nitro, sulfo, or amino group, a substituted or unsubstituted alkoxy group, a substituted or unsubstituted aryloxy group, a substituted or unsubstituted alkoxy- or aryloxy-carbonyl group, a ureido group, a carbamoyl group, a substituted or unsubstituted alkyl-, arylalkyl-, aryl-, diaryl- or dialkyl-carbamoyl group, a sulfamoyl group, a substituted or unsubstituted alkyl-, arylalkyl-, aryl-, diaryl- or dialkyl-sulfamoyl group, a sulfonyl group, an acylamino group, a sulfonylamino group, a substituted or unsubstituted alkyl-, aralkyl-, aryl-, diaryl- or dialkyl-amino group; a substituted or unsubstituted heteroalkyl group, or an acyl group. In a preferred embodiment $R_1$ represents a substituted or unsubstituted alkyl, alkenyl or alkynyl group, a substituted or unsubstituted allyl group, a substituted or unsubstituted aryl group, a substituted or unsubstituted heterocyclic group or a group having the following structure in which R is a substituted or unsubstituted alkyl, alkenyl or alkynyl group, a substituted or unsubstituted allyl group, a substituted or unsubstituted aryl group, or a substituted or unsubstituted heterocyclic group:

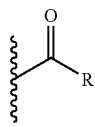

$R_2$ represents hydrogen, a substituted or unsubstituted alkyl, alkenyl or alkynyl group, a substituted or unsubstituted allyl group, a substituted or unsubstituted aryl group, a substituted or unsubstituted heterocyclic group, preferably heteroaryl, or polyoxyalkylene group, a substituted or unsubstituted carboxyalkyl group, a substituted or unsubstituted acyl, amido or sulfo group, or a substituted or unsubstituted alkoxy- or aryloxy-carbonyl group. In a preferred embodiment $R_2$ represents a substituted or unsubstituted alkyl, alkenyl or alkynyl group, a substituted or unsubstituted allyl group, a substituted or unsubstituted aryl group, a substituted or unsubstituted heterocyclic group, or one of the following functional groups in which R is a substituted or unsubstituted alkyl or aryl group:

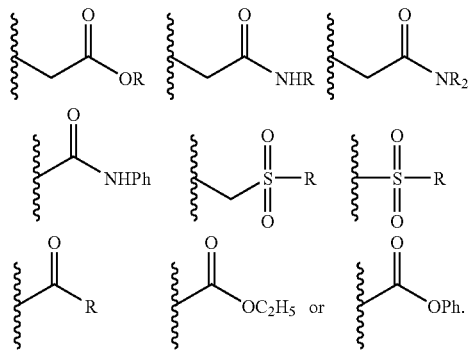

$R_3$ has a Pi of 0 (this specifically includes 0) to 1.5; and preferably $R_3$ has a Pi of greater than or equal to 0.5. Examples of $R_3$ may include, but are not limited to, hydrogen, a substituted or unsubstituted alkyl, alkenyl or alkynyl group, a substituted or unsubstituted allyl group, a substituted or unsubstituted aryl group, a substituted or unsubstituted heteroaryl group, preferably heteroaryl, or polyoxyalkylene group, a substituted or unsubstituted carboxyalkyl group or carboxyaryl group, a substituted or unsubstituted acyl, amido or sulfo group, or a substituted or unsubstituted alkoxy- or aryloxy-carbonyl group. Preferably $R_3$ represents an unsubstituted methyl, ethyl or propyl group, a substituted butyl or pentyl group, a substituted phenyl, a substituted or unsubstituted pyridyl group, a substituted or unsubstituted methylcarboxyalkyl group, in which the alkyl group is between 1 to 3 carbons; a methylcarboxyphenyl group, a substituted or unsubstituted alkenyl or alkynyl group, in which the alkenyl group is from 2–4 carbons, or one of the following functional groups in which R is a substituted or unsubstituted alkyl or aryl group:

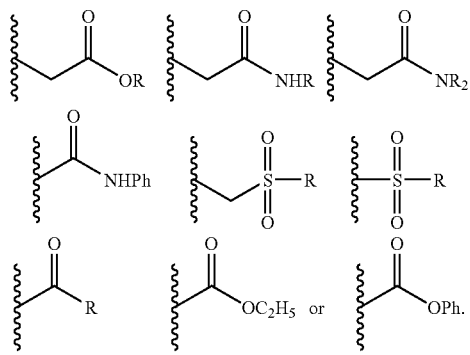

$R_4$ has a Pi of greater than or equal to 0.6, and more preferably $R_4$ has a Pi of greater than or equal to 1.0. Examples of $R_4$ may include, but are not limited to, hydrogen, halogen, a substituted or unsubstituted alkyl, alkenyl or alkynyl group, a substituted or unsubstituted allyl group, a substituted or unsubstituted aryl group, a substituted or unsubstituted heterocyclic group, preferably heteroaryl, or polyoxyalkylene group; a cyano, carboxy, acyl, carboxyalkyl, nitro, sulfo, or amino group, a substituted or unsubstituted alkoxy group, a substituted or unsubstituted aryloxy group, a substituted or unsubstituted alkoxy- or aryloxy-carbonyl group, a ureido group, a carbamoyl group, a substituted or unsubstituted alkyl-, arylalkyl-, aryl-, diaryl- or dialkyl-carbamoyl group, a sulfamoyl group, a substituted or unsubstituted alkyl-, arylalkyl-, aryl-, diaryl- or dialkyl-sulfamoyl group, a sulfonyl group, an acylamino group, a sulfonylamino group, a substituted or unsubstituted alkyl-, aralkyl-, aryl-, diaryl- or dialkyl-amino group; a substituted or unsubstituted heteroalkyl group, or an acyl group. Preferably $R_4$ represents a substituted or unsubstituted alkyl, alkenyl or alkynyl group, a substituted or unsubstituted allyl group, a substituted or unsubstituted aryl group, a substituted or unsubstituted heterocyclic group or a group having the following structure in which R is a substituted or unsubstituted alkyl, alkenyl or alkynyl group, a substituted or unsubstituted allyl group, a substituted or unsubstituted aryl group, or a substituted or unsubstituted heterocyclic group:

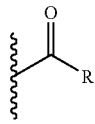

In the above definition, examples of a substituted or unsubstituted alkyl group include methyl, ethyl, isopropyl, hydroxyethyl, 3-sulfopropyl and m-carboxybenzyl. Examples of a substituted or unsubstituted alkenyl group include isoprenyl, propenyl or butadienyl. Examples of a substituted or unsubstituted alkynyl group include propargyl, butynyl, pentynyl. Examples of a substituted or unsubstituted allyl group include methallyl, or 2-methyl-but-3-enyl. The aforementioned groups may be chained, branched, or cyclic. Examples of a substituted or unsubstituted aryl group include phenyl, naphthyl, 3,5-biscarboxyphenyl, and 4-sulfophenyl. Examples of a substituted or unsubstituted heteroaryl or heterocyclic group include pyridyl, imidazolyl, and quinolyl. Examples of halogen include chloro, fluoro, bromo, and iodo. Examples of an acyl group include acetyl and 4-sulfobenzoyl. Examples of a substituted or unsubstituted alkoxy group include methoxy, 3-carboxypropoxy, and 2-hydroxyethoxy. Examples of a substituted or unsubstituted aryloxy group include phenoxy, 3-carboxyphenoxy, and 4-sulfophenoxy. Examples of a substituted or unsubstituted alkoxy- or aryloxy-carbonyl group of 1–10 carbon atoms include methoxycarbonyl, ethoxycarbonyl, 2-methoxyethoxycarbonyl, and 3-sulfophenoxycarbonyl. Examples of a substituted or unsubstituted alkyl-aralkyl-, aryl-, diaryl-or dialkyl carbamoyl group include N-methylcarbamoyl, N-methyl-N-4-sulfophenyl-carbamoyl, N,N-bis(4-carboxyphenyl)carbamoyl. Examples of a substituted or unsubstituted alkyl-aralkyl-, aryl-, diaryl-or dialkyl sulfamoyl group include N-methylsulfamoyl, N-methyl-N-phenyl-sulfamoyl, N-(p-sulfophenyl)sulfamoyl and N,N-bis(4-carboxyphenyl) sulfamoyl. Examples of an acylamino group include acetamido, methoxyethylacetamido, and 3-carboxybenzamido. Examples of a ureido group include N-methylureido, ureido, and N,N'-dimethylureido. Examples of a sulfonylamino group include methanesulfonamido, p-toluenesulfonamido, and 2-sulfatoethanesulfonamido. Examples of a substituted or unsubstituted alkyl-aralkyl-, aryl-diaryl- or dialkylamino group include methylamino, N,N-dimethylamino, methoxyethylamino, and 3-sulfoanilino.

Pi for a given substituent is calculated using the octanol-water partition coefficient (logP) calculation program, KowWin Version 3.3, developed by W. Meylan of Syracuse Research Corporation, 6225 Running Ridge Road, North Syracuse, N.Y. 13212. The logP calculated by KowWin is called Log Kow. The literature article describing the program is W. M. Meylan and P. H. Howard, *Atom/fragment Method for Estimating Octanol-water Partition Coefficients*, J. Pharm. Sci. 84: 83–92, 1995. The Pi of a given substituent is calculated as the difference of the Log Kow of the substituent on benzene, and the Log Kow of benzene (which is 1.99); for example, the Pi value of the t-butyl substituent is 3.90–1.99=1.91, where 3.90 is the Log Kow of t-butyl benzene.

The dyes employed in the invention may be prepared by the methods disclosed in the examples below and in U.S. Pat. No. 4,685,934 and U.S. Pat. No. 3,435,022 incorporated herein by reference. Some examples of useful dyes include, but are not limited to, the following:

Water Insoluble Dye(I)

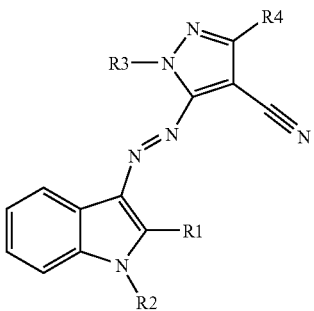

| Dye(I) | R1 | R2 | R3 | R4 |
|--------|----|----|----|----|
| I-1 | (cyclohexyl) | H | H | t-Bu |

-continued

Water Insoluble Dye(I)

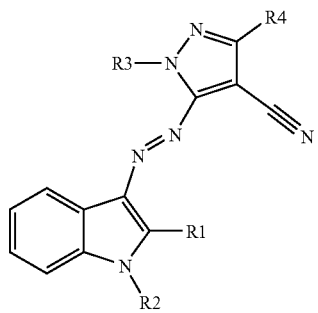

| Dye(I) | R1 | R2 | R3 | R4 |
|---|---|---|---|---|
| I-2 | t-Bu | H | -CH₂-C(=O)-O-Bu-t | t-Bu |
| I-3 | t-Bu | H | H | t-Bu |
| I-4 | t-Bu | H | H | cyclohexyl |
| I-5 | t-Bu | H | CH₃ | t-Bu |
| I-6 | t-Bu | -CH₂-phenyl | CH₃ | t-Bu |
| I-7 | t-Bu | H | H | phenyl |
| I-8 | phenyl | H | H | t-Bu |
| I-9 | COOCH₂CH₃ | H | H | t-Bu |
| I-10 | COOC₄H₉-n | H | H | t-Bu |
| I-11 | t-Bu | CH₃ | CH₃ | t-Bu |

Unless otherwise specifically stated, substituent groups which may be substituted on molecules herein include any groups, whether substituted or unsubstituted, which do not destroy properties necessary for imaging utility. When the term "group" is applied to the identification of a substituent containing a substitutable hydrogen, it is intended to encompass not only the substituent's unsubstituted form, but also its form further substituted with any group or groups as herein mentioned, unless otherwise specifically stated. Suitably, the group may be halogen or may be bonded to the remainder of the molecule by an atom of carbon, silicon, oxygen, nitrogen, phosphorous, or sulfur. The substituent may be, for example, halogen, such as chlorine, bromine or fluorine; nitro; hydroxyl; cyano; carboxyl; or groups which may be further substituted, such as alkyl, including straight- or branched-chain alkyl, such as methyl, trifluoromethyl, ethyl, t-butyl, 3-(2,4-di-t-pentylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy)ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy)butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonyl amino, 2,5-(di-t-pentylphenyl)carbonyl amino, p-dodecyl-phenylcarbonylamino, p-toluylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-toluylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-toluylsulfonamido, p-dodecylbenzenesulfonamido, N-methyltetradecylsulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy) acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-toluylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-toluylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-olylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1(N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3to 7-membered heterocyclic ring composed of carbon atoms and at least one hetero atom selected from the group consisting of oxygen, nitrogen and sulfur, such as 2-furyl, 2-thienyl, 2-benzimidazolyloxy, or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired properties for a specific application.

The ethylenically-unsaturated monomers which can be used in the invention include, for example, the following monomers and their mixtures: acrylic acid, methacrylic acid, ethacrylic acid, methyl acrylate, ethyl acrylate, ethyl methacrylate, benzyl acrylate, benzyl methacrylate, propyl acrylate, propyl methacrylate, iso-propyl acrylate, iso-propyl methacrylate, butyl acrylate, butyl methacrylate, hexyl acrylate, hexyl methacrylate, octadecyl methacrylate, octadecyl acrylate, lauryl methacrylate, lauryl acrylate, hydroxyethyl acrylate, hydroxyethyl methacrylate, hydroxyhexyl acrylate, hydroxyhexyl methacrylate, hydroxyoctadecyl acrylate, hydroxyoctadecyl methacrylate, hydroxylauryl methacrylate, hydroxylauryl acrylate, phenethylacrylate, phenethyl methacrylate, 6-phenylhexyl acrylate, 6-phenylhexyl methacrylate, phenyllauryl acrylate, phenyllaurylmethacrylate, 3-nitrophenyl-6-hexyl methacrylate, 3-nitrophenyl-18-octadecyl acrylate, ethyleneglycol dicyclopentyl ether acrylate, vinyl ethyl ketone, vinyl propyl ketone, vinyl hexyl ketone, vinyl octyl ketone, vinyl butyl ketone, cyclohexyl acrylate, 3-methacryloxypropyl-dimethylmethoxysilane, 3-methacryloxypropyl-methyldimethoxysilane, 3-methacryloxypropyl-pentamethyldisiloxane, 3-methacryloxypropyltris-(trimethylsiloxy)silane, 3-acryloxypropyl-dimethylmethoxysilane, acryloxypropylmethyldimethoxysilane, trifluoromethyl styrene, trifluoromethyl acrylate, trifluoromethyl methacrylate, tetrafluoropropyl acrylate, tetrafluoropropyl methacrylate, heptafluorobutyl methacrylate, isobutyl acrylate, isobutyl methacrylate, 2-ethylhexyl acrylate, 2-ethylhexyl methacrylate, isooctyl acrylate, isooctyl methacrylate, N,N-dihexyl acrylamide, N,N-dioctyl acrylamide, N,N-dimethylaminoethyl acrylate, N,N-dimethylaminoethyl methacrylate, N,N-diethylaminoethyl acrylate, N,N-diethylaminoethyl methacrylate, piperidino-N-ethyl acrylate, vinyl propionate, vinyl acetate, vinyl butyrate, vinyl butyl ether, and vinyl propyl ether ethylene, styrene, vinyl carbazole, vinyl naphthalene, vinyl anthracene, vinyl pyrene, methyl methacrylate, methyl acrylate, alpha-methylstyrene, dimethylstyrene, methylstyrene, vinylbiphenyl, glycidyl acrylate, glycidyl methacrylate, glycidyl propylene, 2-methyl-2-vinyl oxirane, vinyl pyridine, aminoethyl methacrylate, aminoethylphenyl acrylate, maleimide, N-phenyl maleimide, N-hexyl maleimide, N-vinyl-phthalimide, and N-vinyl maleimide poly(ethylene glycol) methyl ether acrylate, polyvinyl alcohol, vinyl pyrrolidone, vinyl 4-methylpyrrolidone, vinyl 4-phenylpyrrolidone, vinyl imidazole, vinyl 4-methylimidazole, vinyl 4-phenylimidazole, acrylamide, methacrylamide, N,N-dimethyl acrylamide, N-methyl acrylamide, N-methyl methacrylamide, aryloxy dimethyl acrylamide, N-methyl acrylamide, N-methyl methacrylamide, aryloxy piperidine, and N,N-dimethyl acrylamide acrylic acid, methacrylic acid, chloromethacrylic acid, maleic acid, allylamine, N,N-diethylallylamine, vinyl sulfonamide, sodium acrylate, sodium methacrylate, ammonium acrylate, ammonium methacrylate, acrylamidopropanetriethylammonium chloride, methacrylamidopropane-triethylammonium chloride, vinyl-pyridine hydrochloride, sodium vinyl phosphonate and sodium 1-methylvinylphosphonate, sodium vinyl sulfonate, sodium 1-methylvinyl-sulfonate, sodium styrenesulfonate, sodium acrylamidopropanesulfonate, sodium methacrylamidopropanesulfonate, and sodium vinyl morpholine sulfonate, allyl methacrylate, allyl acrylate, butenyl acrylate, undecenyl acrylate, undecenyl methacrylate, vinyl acrylate, and vinyl methacrylate; dienes such as butadiene and isoprene; esters of saturated glycols or diols with unsaturated monocarboxylic acids such as, ethylene glycol diacrylate, ethylene glycol dimethacrylate, triethylene glycol dimethacrylate, 1,4-butanediol dimethacrylate, 1,3-butanediol dimethacrylate, pentaerythritol tetraacrylate, trimethylol propane trimethacrylate and polyfunctional aromatic compounds such as divinylbenzene and the like.

The polymer formed by the ethylenically-unsaturated monomers may be a homopolymer, a copolymer, or a cross-linked polymer. Preferably the resulting polymer is water insoluble. In one embodiment of the invention, the polymer formed is a cross-linked polymer, and the ethylenically-unsaturated monomers which may be employed are a mixture of monomers which comprises a) an ethylenically-unsaturated monomer being free of ionic charge groups and capable of addition polymerization to form a substantially water-insoluble homopolymer, and b) an ethylenically-unsaturated monomer capable of being a cross-linker. In another embodiment, an ethylenically-unsaturated monomer capable of addition polymerization to form a substantially water-soluble homopolymer may additionally be utilized to form the copolymer or the cross-linked polymer. In one suitable embodiment, the ratio of the ethylenically-unsaturated monomer to the cross-linking monomer is from about 97:3 to about 50:50. The ethylenically-unsaturated monomer free of ionic charge groups may comprise, for example, methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate, acrylonitrile, methacrylonitrile, vinyl acetate, vinyl propionate, vinylidene chloride, vinyl chloride, styrene, t-butyl styrene, vinyl toluene, butadiene, or isoprene. The water soluble ethylenically-unsaturated monomer may comprise, for example, N,N-dimethyl acrylamide, acrylic acid, methacrylic acid, chloromethacrylic acid, maleic acid, allylamine, N,N-diethylallylamine, vinyl sulfonamide, sodium acrylate, sodium methacrylate, ammonium acrylate, ammonium methacrylate, acrylamidopropane-triethylammonium chloride, methacrylamidopropane-triethylammonium chloride, vinyl-pyridine hydrochloride, sodium vinyl phosphonate and sodium 1-methylvinylphosphonate, sodium vinyl sulfonate, sodium 1-methylvinyl-sulfonate, or sodium styrenesulfonate. The cross-linking ethylenically-unsaturated monomer may comprise, for example, vinyl acrylate and vinyl methacrylate; dienes such as butadiene and isoprene; esters of saturated glycols or diols with unsaturated monocarboxylic acids, such as ethylene glycol diacrylate, ethylene glycol dimethacrylate, triethylene glycol dimethacrylate, 1,4-butanediol dimethacrylate, 1,3-butanediol dimethacrylate, pentaerythritol tetraacrylate and trimethylol propane trimethacrylate and polyfunctional aromatic compounds such as divinylbenzene, and the like. Preferred monomer types are acrylates, styrenic, and others.

The organic medium may comprise only the ethylenically saturated monomers or it may contain an additional solvent if the dye does not have the required solubility in the monomers alone. The additional solvents used can be selected from most organic solvents, such as ethers, alcohols, tetrahydrofuran, chloroform, methylene chloride, ethylene dichloride, ethyl acetate, toluene, methanol, ethanol, ethylene glycol, diethylene glycol, triethylene glycol, etc. If a solvent is utilized, it preferably is removed after the polymerization step.

In the next step of the invention the colorant mixture is combined with an aqueous mixture comprising a surfactant and a co-stabilizer to form a colorant mixture/aqueous mixture. In accordance with the invention, the co-stabilizers used can be, for example, any of the solid colloidal materials such as clays, silica, or inorganic metal salts, hydroxides or oxides; or organic materials such as starches, sulfonated cross-linked organic homopolymers, resinous polymers and copolymers, such as copoly(styrene-2-hydroxyethyl methacrylate-methacrylic acid-ethylene glycol dimethacrylate), hexadecane, cetyl alcohol, and any steric hydrophobic stabilizers. Preferred co-stabilizers include starches, sulfonated cross-linked organic homopolymers, resinous polymers, and copolymers, such as copoly(styrene-2-hydroxyethyl methacrylate-methacrylic acid-ethylene glycol dimethacrylate), hexadecane, cetyl alcohol, and any steric hydrophobic stabilizers; and most preferred co-stabilizers include hexadecane, cetyl alcohol, and any steric hydrophobic stabilizers. The amount of the co-stabilizer used can be a 0.1:1 to 10:1 ratio to the surfactants used, and more preferably a 1:1 to 10:1 ratio to the surfactants used. This step is normally performed at room temperature.

Surfactants that can be used in the present invention include, for example, a sulfate, a sulfonate, a cationic compound, a reactive surfactant, an amphoteric compound, and a polymeric protective colloid. Specific examples are described in "McCutcheon's Emulsifiers and Detergents: 1995, North American Editor" and will be known to those skilled in the art.

In accordance with the invention, the colorant mixture/ aqueous mixture is mixed via strong mechanical agitation, such as by sonification, homogenation, or microfluidization to form a stable aqueous droplet mixture. The duration of the mixing time depends on the types of monomers, colorants, and surfactants. The agitation usually can be stopped between 1 minute to 40 minutes. Detailed information about the process and the stabilizers can be found in "*Emulsion Polymerization and Emulsion Polymers*" (P. A. Lovell, M. S. El-Aasser, John Wiley & Sons Ltd., England, 1997), incorporated herein by reference.

An addition polymerization initiator is introduced anytime prior to polymerization, preferably after the formation of the colorant mixture/aqueous mixture. After the formation of the aqueous droplet mixture, polymerization is initiated to form polymer dye particles comprising a colorant phase and a polymer phase. In accordance with the invention, a preferred way to cause an addition polymerization initiator to form a free radical is by using heat. Depending on the types of initiators used, the reaction temperature can vary from about 30° C. to about 90° C. Preferably the reaction temperature is at least 40° C., and most preferably at least 50° C. To ensure that no free monomer is present, usually the reaction is continued for a time after the monomer addition. Also, more initiator may need to be added as a scavenger during the final stage of the reaction to increase the reaction conversion.

Addition polymerization initiators useful in the practice of the invention include, for example, azo and diazo compounds, such as 2,2'-azobisisobutyronitrile, 2,2'-azobis(2,4-dimethyl valeronitrile), 2,2'-azobis(2,3-dimethyl butyronitrile), 2,2'-azobis(2-methyl butyronitrile), 2,2'-azobis(2,3,3-trimethyl butyronitrile), 2,2'-azobis(2-isopropyl butyronitrile), 1,1'-azobis(cyclohexane-1-carbonitrile), 2,2'-azobis(4-methoxyl-2,4-dimethyl. valeronitrile), 2-(carbamoylazo)isobutyronitrile, 4,4'-azobis(4-cyanovaleric acid), and dimethyl-2,2'azobis isobutyrate, or peroxide compounds, such as butyl peroxide, propyl peroxide, butyryl peroxide, benzoyl isobutyryl peroxide, and benzoyl peroxide, or water soluble initiators, for example, sodium persulfate, and potassium persulfate, or any redox initiators. Preferred initiators are the oil soluble initiators. Examples of particularly suitable initiators are azo, peroxide, persulfate, and redox initiators. The initiators may be used in an amount varying from about 0.2 to 4 weight percent or higher by weight of the total monomers. A chain transfer agent such as butyl mercaptan may also be used to control the properties of the polymer formed.

The term "composite" means that the colorant particles prepared by the process of the invention comprise at least two physical phases, a colorant phase, free of solvent, and a polymer phase. The phase domains are not separated apart from each other, and there are bonds or interfaces between them. The composite polymer-dye particles preferably have a particle size of less than 1 μm, more preferably they have a particle size of less than 200 nm, and most preferably they have a particle size of less than 100 nm. It is preferred that the polymer phase has a molecular weight of greater than about 5000 and more preferably greater than 10,000. In one suitable embodiment, the composite polymer-dye particles have a mean size of less than about 200 nm, and the polymer phase of each particle has a molecular weight of greater than about 5000. The ratio of the colorant phase to the polymer phase is preferably from about 10:90 to about 90:10, and more preferably from about 20:80 to about 50:50. The co-stabilizer will remain associated with the composite polymer dye particles. Generally, the co-stabilizer is on the surface of the polymer dye particles and operates to stabilize the particles.

While the polymer-dye particles prepared by the process of the invention described herein are illustrated for use in ink jet inks, they may also have other applications such as, e.g., in paints, inks for writing pens, markers, cosmetic products, etc.

In forming an ink jet ink, it is desirable to make the polymer-dye particles in the form of a concentrate. The concentrate is then diluted with an appropriate solvent to a concentration best for viscosity, color, hue, saturation density, and print area coverage for the particular application. Acceptable viscosities for such inks, as determined using a Brookfield apparatus and related methods, are generally not greater than 20 centipoise and are preferably in the range of about 1 to 15 centipoise.

The polymer-dye particles prepared by the process of the invention can comprise up to about 30% by weight of an ink jet ink composition, and preferably from about 0.05 to 15 wt. %. Co-solvents or a humectant can also be added to the ink composition to help prevent the ink from drying out or crusting in the orifices of the print head. Classes of co-solvents and humectants which may be employed include, but are not limited to, monohydric alcohols with carbon chains greater than about 10 carbon atoms such as decanol, dodecanol, oleoyl alcohol, stearoyl alcohol, hexadecanol, eicosanol, polyhydric alcohols, such as ethylene glycol, alcohol, diethylene glycol(DEG), triethylene glycol, propylene glycol, tetraethylene glycol, polyethylene glycol, glycerol, 2-methyl-2,4-pentanediol, 2-ethyl-2-hydroxymethyl-1, 3-propanediol(EHMP), 1,5-pentanediol, 1,2-hexanediol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, poly(ethylene glycol) monobutyl ether (PEGMBE), and diethylene glycol monobutylether(DEGMBE); nitrogen-containing compounds, such as urea, 2-pyrrolidinone, N-methyl-2-pyrrolidinone, and 1,3-dimethyl-2-imidazolidinone; and sulfur-containing compounds such as dimethyl sulfoxide and tetramethylene sulfone.

In an ink jet ink, the polymer phase composition can be selected to maximize the compatibility of the composite particles with the organic solvent used in the formulation, and to maximize the interaction with the substrate where the ink is applied. The maximized compatibility with the organic solvent produces long-term storage stability, and the maximized interaction with the substrate improves the adhesion or smudge resistance of the image area.

Polymeric binders can also be added to an ink prepared using the polymer-dye particles prepared by the process of the invention to improve the adhesion of the colorant to the support by forming a film that encapsulates the colorant upon drying. Examples of polymers that can be used include polyesters, polystyrene/acrylates, sulfonated polyesters, polyurethanes, polyimides, and the like. The polymers may be present in amounts of from about 0.01 to about 15 percent by weight, and more preferably from about 0.01 to about 5 percent by weight based on the total amount of components in the ink.

A biocide may be added to an ink jet ink composition to suppress the growth of micro-organisms such as molds, fungi, etc., in aqueous inks. A preferred biocide for an ink composition is Proxel® GXL (Zeneca Specialties Co.) at a final concentration of 0.0001–0.5 wt. %. Additional additives which may optionally be present in an ink jet ink composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers, and defoamers.

Ink jet inks made using polymer-dye particles prepared by the process of this invention are employed in ink jet printing wherein liquid ink drops are applied in a controlled fashion to an ink receptive substrate, by ejecting ink droplets from plurality of nozzles, or orifices, in a print head of ink jet printers.

Commercially available ink jet printers use several different methods to control the deposition of the ink droplets. Such methods are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

Ink jet inks using polymer-dye particles prepared by the process of this invention can be employed in ink jet printing wherein liquid ink drops are applied in a controlled fashion to an ink receptive layer substrate, by ejecting ink droplets from the plurality of nozzles, or orifices, in a print head of ink jet printers.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following examples are intended to illustrate, but not to limit, the present invention.

EXAMPLES

The following dyes were used in the present invention:

Water Soluble Control Dye

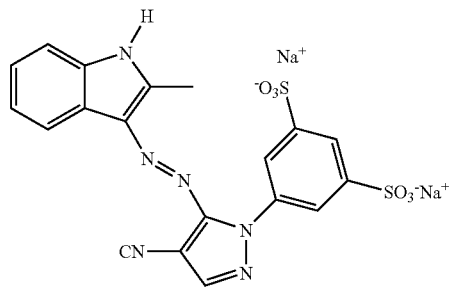

Preparation of Yellow Dyes

Pyrazole 1 (CAS 141458-80-2) and other pyrazoles were prepared from known literature methods, for example, by the following route (Hanefeld, U., Rees, C. W., White, A. J. P., Williams, D. J., J Chem Soc Perk T 1; (13) 1545, 1996:

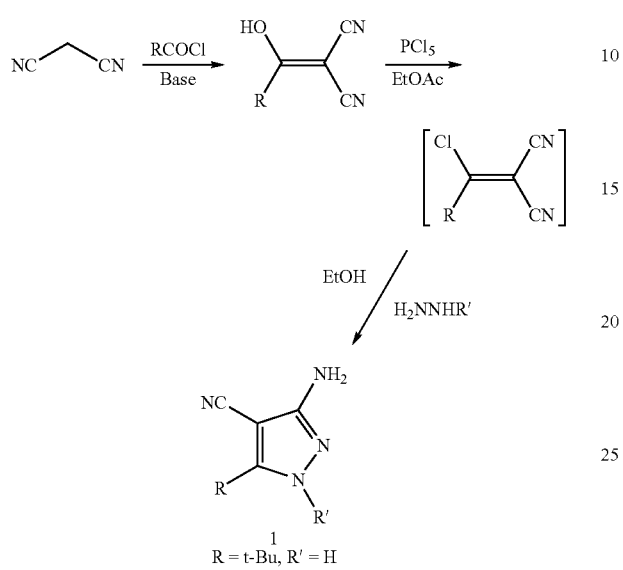

t-Butyl indole (CAS) was prepared by the method of Russell, R. A., Aust. J Chem 1975, 28, 2535.

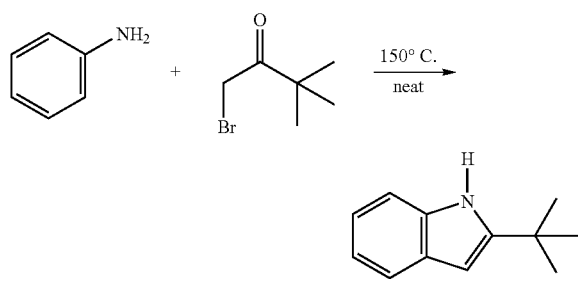

Other indoles were obtained from commercial sources or prepared by other common literature methods.

A few examples to synthesize these dyes listed in Table 1 are illustrated below; the rest of the compounds in Table 1 were synthesized similarly with the appropriate precursors.

Synthesis of Inventive Dye I-3:

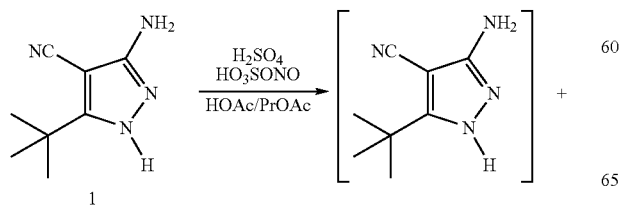

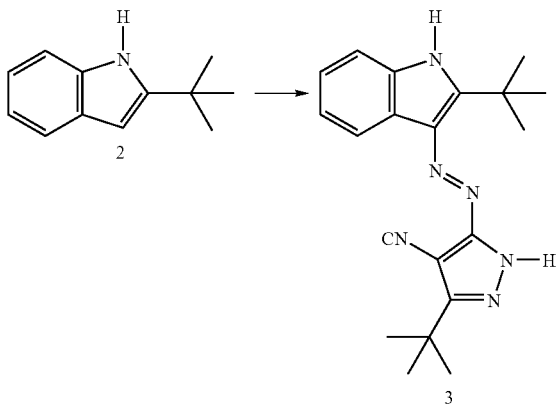

The pyrazole 1 (9.84, 0.06 mol) was added with stirring to a beaker containing 120 mL of a mixture of 1:5 propionic: acetic acid. The mixture was cooled in ice and to it was added 48 g sulfuric acid. The mixture exothermed to 37° C. and a dark orange solution resulted. When the solution had cooled to 5° C., nitrosylsulfuric acid (commercial, 40 wt %, 20 g, 0.063 mol) was added. The mixture was stirred for 2 hr while maintaining the temperature below 10° C. After this time, 120 mg of urea was added, and after stirring 10 minutes the diazonium solution was added in portions to a stirred solution of 2-t-butyl indole 2 (10.38 g, 0.06 mol) in 80 mL acetic acid which had been placed in an ice bath and cooled to less than 20° C. During the addition, the temperature was maintained at 25° C. or less. A red color developed and the mixture became thick as the product began to precipitate. It was stirred and allowed to come to room temperature for one hour. Sodium acetate (35 USC § 102 gm, 1.2 mol) was added followed by 1 L of ice water. After one hour the solid was collected by filtration and air dried overnight. The crude solid was refluxed in a minimal quantity of acetonitrile, cooled and filtered, then oven dried overnight under vacuum to provide 18.7 g (89%) of dye 3 which was 95.6 A % pure by reverse phase HPLC. NMR (DMSO) δ 8.4, d, 1H, 7.5, d, 1H, 7.3, m, 2H, 1.5, s, 9H, 1.3, s, 9H.

Synthesis of Inventive Dye I-2:

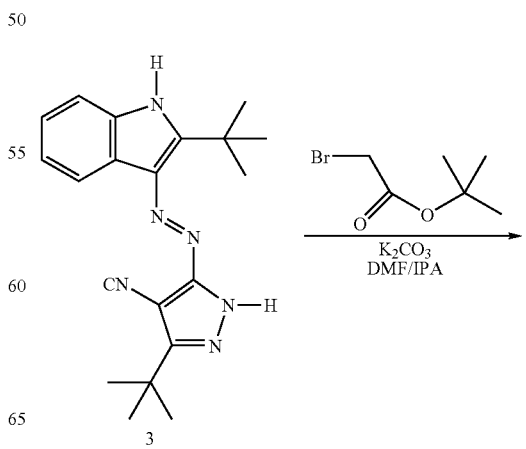

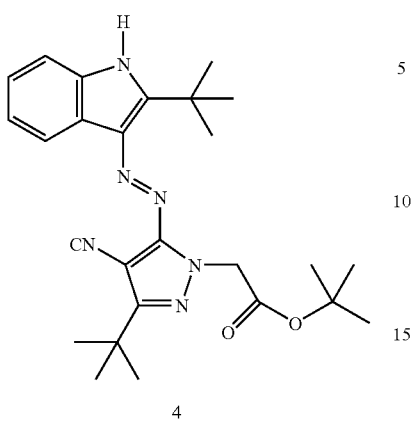

4

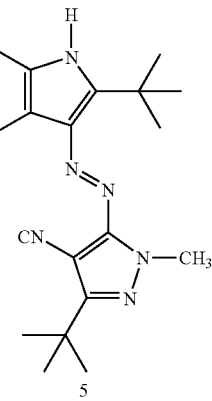

5

To a stirred solution of Dye 3 (12.2 g, 0.035 mol) in a mixture of 23 mL of dimethylformamide and 88 mL of isopropanol in a 50 mL round bottomed flask was added anhydrous potassium carbonate (5.8 g, 0.042 mol) followed by t-butyl bromoacetate (12 g, 0.105 mol). The mixture was heated to reflux for two hours after which time TLC (1:1:1 methylene chloride:ethyl acetate:heptanes) showed conversion of the starting material to a higher moving product spot. The mixture was concentrated by rotory evaporation and partitioned between 500 mL ethyl acetate, and 250 mL water. The organic phase was washed with an additional 250 mL portion of water, a 100 mL portion of saturated aqueous sodium chloride, dried over magnesium sulfate, filtered, and stripped of solvent by rotory evaporation to provide a yellow orange solid. The crude solid was purified by recrystallization from approx. 4:1 heptanes:ethyl acetate to provide 16.2 g (75%) of dye 4 as a yellow solid, 98.7 A % by reverse phase HPLC.

NMR(DMSO) δ 8.13, d, 1H, 7.48, d, 1H, 7.25, m, 2H, 5.15, s, 2H, 1.7, s, 9H, 1.5 s, 18H.

Synthesis of Inventive Dye I-5:

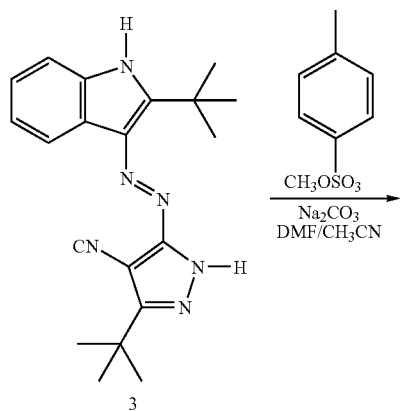

3

To a stirred solution of Dye 3 (4 g, 0.0116 mol) in a mixture of 20 mL of dimethylformamide and 100 mL of acetonitrile was added anhydrous sodium carbonate (1.23 g, 0.0116 mol) followed by methyl p-toluenesulfonate (2.2 g, 0.0118 mol). The mixture was heated to reflux and stirred for four hours under nitrogen. After each hour, an additional 2.2 g of methyl p-toluenesulfonate was added until all starting material had been consumed as judged by TLC (1:1:1 methylene chloride:ethyl acetate:heptanes). The mixture was cooled, then partitioned between ethyl acetate and water. The organic phase was washed with additional water, 10% HCl, saturated aqueous sodium chloride, dried over magnesium sulfate, filtered, and stripped of solvent by rotory evaporation to provide a yellow orange solid which was recrystallized from acetonitrile/water and oven dried under vacuum at 40° C. to provide two crops of dye 5 totaling 4.26 g (96%), which was 98 A % by reverse phase HPLC.

NMR(DMSO) δ 8.25,d,1H, 7.49,d,1H, 7.25,m,2H, 2.4,s, 3H, 1.4,s,9H, 1.6,s,9H.

Synthesis of Inventive Dye I-11:

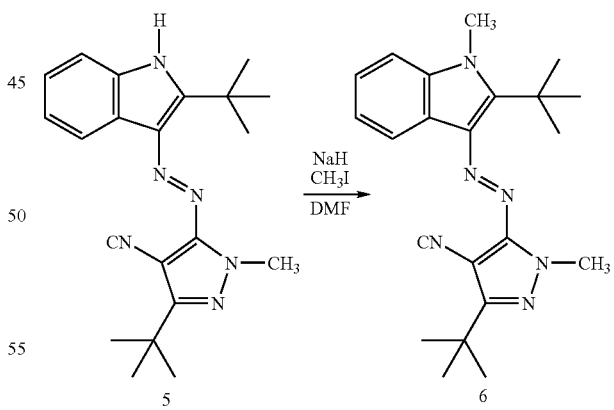

Under a stream of dry nitrogen, sodium hydride (0.2 g of 60% oil dispersion, 0.005 mol) was added to a stirred solution of dye 5 (1.42 g, 0.004 mol) in 10 mL of dry dimethylformamide, with cooling in an ice water bath. The mixture fizzed and was stirred for 10 min. It was then treated with methyl iodide (1.14 g, 0.008 mol) and allowed to stir and warm to room temperature overnight. An additional 1.14 g portion of methyl iodide was added, and the mixture was stirred for 3 hrs after which time TLC (1:1:1 methylene chloride:ethyl acetate:heptanes) showed complete conversion to an upper moving product spot. The mixture was partitioned between water and ethyl acetate. The organic layer was washed successively with 10% aq. HCL, water, saturated aqueous bicarbonate, saturated aqueous sodium chloride, dried over magnesium sulfate, filtered and stripped of solvent by rotory evaporation to provide an oil which was crystallized by trituration with heptanes. The product was collected by filtration and oven dried overnight under vacuum at 40° C. to provide 0.89 g yellow solid which was 95 A % pure by reverse phase HPLC.

NMR(DMSO) δ 8.25,d,1H, 7.49,d,1H, 7.25,m,2H, 4.1,s, 6H, 1.4,s, 9H, 1.75,s,9H

Preparation of Polymer-Dye Particle Dispersions

Polymer-dye Particle Dispersion 1 (PI-1)

In a 250 ml beaker, 1 g of Yellow dye I-1 synthesized above was added, and also added were 2.4 g of styrene, 2.4 butyl methacrylate, and 1.2 g of divinyl benzene, and 2.5 g of ethyl acetate. After the addition, the mixture was well stirred. In another beaker, 50 g of deionized water, 0.6 g of sodium dodecyl sulfonate surfactant, and 1.8 g of hexadecane were added and well stirred. The organic phase and the aqueous phase were agitated violently under either sonification or microfluidizer for more than 20 minutes. The organic aqueous mixture was added to the reactor, and 0.09 g of initiator azobisisobutyronitrile (AIBN) in 1 gram of toluene was then added to the reactor and the reaction temperature was set at 80° C. The reaction was allowed to continue for 12 more hours before the reactor was cooled down to room temperature. The organic solvent was removed under reduced pressure. The polymer-dye particle dispersion prepared was filtered through glass fibers to remove any coagulum. The particles made contain about 17% by weight of a colorant phase and about 83% by weight of a polymer phase. The initiator was added before the sonification or microfluidizer. The particle size was measured by a Microtrac Ultra Fine Particle Analyzer (Leeds and Northrup) at a 50% median value. The polymer-dye particles are designated as Polymer-dye Particle Dispersion 1 (PI-1).

Polymer-Dye Particle Dispersion 2 to 11 (PI-2 to PI-11)

Polymer-dye Particle Dispersions PI-2 to PI-11 were prepared in a similar manner to Polymer-dye Particle Dispersion 1 except different Yellow dyes as listed in Table 2 were used to prepare the polymer-dye particle dispersion.

Polymer-Dye Control Particle Dispersion1 1 to 6 (PC-1 to PC-6)

Polymer-dye Control Particle Dispersions PC-1 to PC-6 were prepared in a similar manner to Polymer-dye Particle Dispersion 1 except different Yellow dyes as listed in Table 2 were used to prepare the polymer-dye particle dispersion.

Ink Formulation

The inks used in the present invention are prepared as follows, and they are summarized in Table 2:

Ink 1 of the Invention (Ink I-1)

To prepare Ink 1 of the Invention, 5.0 g of Polymer-dye Particle Dispersion PI-1, 0.05 g Surfynol® 465 (Air Products Inc.), 1.2 g diethylene glycol, 1.0 g of glycerol, and 0.5 g di(propyleneglycol)methyl ether (Dowanol® DPM) were added distilled water so that the final ink is 10.0 g. The final ink contained 50% of Polymer-dye Particle Dispersion PI-1, 0.5% Surfynol® 465, 12% diethylene glycol, 10% glycerol and 5% di(propyleneglycol)methyl ether). The final ink was filtered through a 1 μm polytetrafluoroethylene filter. The ink is designated as Ink I-1.

Ink 2 to Ink 11 of the Invention

These inks were prepared similarly to Ink I-1 except that the corresponding Polymer-dye Particle Dispersions listed in Table 2 are used instead of Polymer-dye Particle Dispersion PI-1.

Comparative Ink 1 (Ink C-1)

Comparative Ink 1 used in the present invention was prepared similarly to Ink I-1 except that Comparative Polymer-dye Particle Dispersion PC-1 was used instead of Polymer-dye Particle Dispersion PI-1.

Comparative Ink 2 to 6 (Ink C-2 to Ink C-6)

These inks were prepared similarly to Ink C-1 except that the corresponding Polymer-dye Particle Dispersions listed in Table 2 are used instead of Polymer-dye Particle Dispersion PC-1.

Comparative Ink 7 (Ink C-7)

Comparative Ink C-7 was prepared similarly to Ink I-1 except that 3.75 g of the Water Soluble Control Dye (10% active) was used instead of Polymer-dye Particle Dispersion PI-1. The final ink contained 3.75% of Water Soluble Control Dye 1.

Dispersion and Ink Stability Test

The polymer-dye particle dispersions and the inks prepared above were placed in a sample bottle made of glass and allowed to stand at room temperature for three months. The fresh dispersions and the fresh inks were measured for particle size as described before. Also at the end of each month, the particle size of both the dispersions and the inks were measured again.

The definition of "stable" for both the dispersions and the inks: For the fresh dispersions and inks, particle size measurement results of the average particle size at 50% UPA are less than 1 μm; and also after storage for three months, the particle size measurement of the dispersion and ink has no significant change (<50% change) compared to that for the fresh samples.

The definition of "unstable" for both the dispersions and the inks: For the fresh dispersions and inks, particle size measurement results of the average particle size at 50% UPA are equal or greater than 1 μm. Or even for the fresh dispersions and inks, particle size measurement results of the average particle size at 50% UPA are less than 1 μm. However, after storage for less than three days, the particle size measurement of the dispersion and ink has significant change (>=50% change) compared to that for the fresh samples.

The testing results of the above polymer-dye particle dispersions and inks are listed in Table 2.

Calculation of Pi Value and Modeling

An important feature of the compounds of the invention is their hydrophobicity pattern, defined by the Pi values of the $R_3$ and R4 substituents. Pi for a given substituent is calculated using the octanol-water partition coefficient (logP) calculation program, KowWin Version 3.3, developed by W. Meylan of Syracuse Research Corporation, 6225 Running Ridge Road, North Syracuse, N.Y. 13212. The logP calculated by KowWin is called Log Kow. The literature article describing the program is W. M. Meylan, and P. H.

Howard, *Atom/fragment contribution method for estimating octanol-water partition coefficients*, J. Pharm. Sci. 84: 83–92, 1995. The Pi of a given substituent is calculated as the difference of the Log Kow of the substituent on benzene, and the Log Kow of benzene (which is 1.99). For example, the Pi value of the t-butyl substituent is 3.90−1.99=1.91, where 3.90 is the Log Kow of t-butyl benzene. The Pi values for the substituents at the $R_3$ and $R_4$ positions in the Water Insoluble Dye (I) are labeled as $Pi(R_3)$ and $Pi(R_4)$, respectively, and the results are listed in the above-mentioned Table 2.

The compounds of this invention have Pi between 0.0 and 1.5 (inclusive) for the substituent at Position $R_3$ and Pi greater than or equal to 0.06 for the substituent at Position $R_4$ for the scheme.

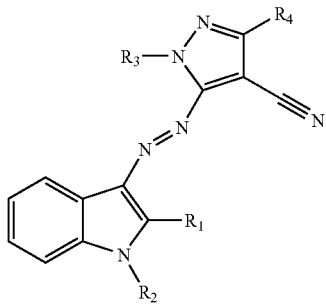

As shown in Table 2, Examples I-1–I-11 all have $Pi(R_3)$ and $Pi(R_4)$ within the prescribed limits, and both the dispersions and inks are stable. Comparative Examples all have either $Pi(R_3)$ value, $Pi(R_4)$ or both outside the prescribed limits, either the inks or both dispersions and inks are not stable.

TABLE 2

| Dye | Polymer-dye Particle Dispersion | Ink | Pi $R_3$ | $R_4$ | Dispersion Stability | Ink Stability |
|---|---|---|---|---|---|---|
| C-1 | PC-1 | Ink C-1 | 3.95 | 1.91 | Stable | Unstable |
| C-2 | PC-2 | Ink C-2 | 2.31 | 1.91 | Stable | Unstable |
| C-3 | PC-3 | Ink C-3 | 0.55 | 0 | Unstable | — |
| C-4 | PC-4 | Ink C-4 | 0.55 | 0 | Unstable | — |
| C-5 | PC-5 | Ink C-5 | 1.46 | 0.55 | Stable | Unstable |
| C-6 | PC-6 | Ink C-6 | 0.55 | 0.55 | Stable | Unstable |
| I-1 | PI-1 | Ink I-1 | 0 | 1.91 | Stable | Stable |
| I-2 | PI-2 | Ink I-2 | 1.45 | 1.91 | Stable | Stable |
| I-3 | PI-3 | Ink I-3 | 0.0 | 1.91 | Stable | Stable |
| I-4 | PI-4 | Ink I-4 | 0 | 2.82 | Stable | Stable |
| I-5 | PI-5 | Ink I-5 | 0.55 | 1.91 | Stable | Stable |
| I-6 | PI-6 | Ink I-6 | 0.55 | 1.91 | Stable | Stable |
| I-7 | PI-7 | Ink I-7 | 0.0 | 1.77 | Stable | Stable |
| I-8 | PI-8 | Ink I-8 | 0 | 1.91 | Stable | Stable |
| I-9 | PI-9 | Ink I-9 | 0 | 1.91 | Stable | Stable |
| I-10 | PI-10 | Ink I-10 | 0 | 1.91 | Stable | Stable |
| I-11 | PI-11 | Ink I-11 | 0.55 | 1.91 | Stable | Stable |

Printing Element Preparation

Comparative Element 1 (EC-1) (Water Soluble Dye/No Polymer in Ink)

The Comparative Ink 7 (Ink C-7) was filtered through a 1 μm polytetrafluoroethylene filter and filled into an airbrush (Paasche Sirbrush Set H-3 available from Paasche Airbrush Company, Harwood Heights, Ill.) connected to compressed house air. The pressure of the airbrush was adjusted to about 20 lb such that smooth ink flow was obtained. The inks were sprayed onto commercially available Epson Premium Glossy Paper, Cat. No SO41286, using the above ink with variable density levels. The sample was allowed to dry for 24 hours at ambient temperature and humidity.

Element 1 of the Invention (EI-1) (Water Insoluble Dye)

Element 1 of the Invention is prepared similarly except that Inventive Ink I-2 was used instead of Ink C-7.

Element 2 of the Invention (EI-2) (Water Insoluble Dye)

Element 1 of the Invention is prepared similarly except that Inventive Ink I-3 was used instead of Ink C-7.

Stability Tests

The above elements were subjected to ozone test. Ozone stability test was done by placing the above elements in an ozone chamber (~5 ppm ozone level, 50% relative humidity) for 24 hours. The Status A reflection densities of density patches of the elements with initial density level of 1.0 were measured using an X-Rite® 414 densitometer before and after the ozone fade test. The percentages of the Status A densities retained were calculated and are listed in Table 3.

TABLE 3

| Element | Ink | Ozone Stability (% Retained at Density 1.0) |
|---|---|---|
| EC-1 | Ink C-7 | 18% |
| EI-1 | Ink I-2 | 47% |
| EI-2 | Ink I-3 | 50% |

The above results show that the inks of the invention show significant ozone stability improvement compared with inks formulated with the Water Soluble Control Dye. Furthermore, as shown in Table 2, dyes used in the present invention show improved dispersion stabilit, as well as ink stability compared with those of the comparative ones.

The invention has been described in detail with particular reference to certain preferred embodiments thereof, but it will be understood that variations and modifications can be effected within the spirit and scope of the invention.

What is claimed is:

1. An ink composition comprising water, a humectant, and polymer-dye particles, wherein said polymer-dye particles comprise a colorant phase containing a water insoluble dye of formula (I), and a polymer phase, said phases having an interface between them, and said particles being associated with a co-stabilizer

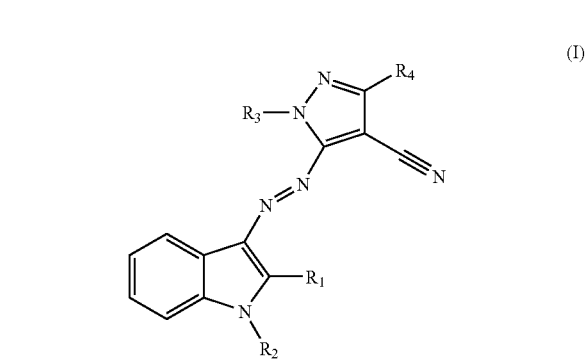

wherein $R_1$ represents hydrogen, halogen, a substituted or unsubstituted alkyl, alkenyl or alkynyl group, a substituted or unsubstituted allyl group, a substituted or unsubstituted aryl group, a substituted or unsubstituted heterocyclic group or polyoxyalkylene group; a cyano, carboxy, acyl, carboxyalkyl, nitro, sulfo, or amino group, a substituted or unsubstituted alkoxy group, a substituted or unsubstituted aryloxy group, a substituted or unsubstituted alkoxy- or aryloxy-carbonyl group, a ureido group, a carbamoyl group, a substituted or unsubstituted alkyl-, arylalkyl-, aryl-, diaryl- or dialkyl-carbamoyl group, a sulfamoyl group, a substituted or unsubstituted alkyl-, arylalkyl-, aryl-, diaryl- or dialkyl-sulfamoyl group, a sulfonyl group, an acylamino group, a sulfonylamino group, a substituted or unsubstituted alkyl-, aralkyl-, aryl-, diaryl- or dialkyl-amino group; a substituted or unsubstituted heteroalkyl group, or an acyl group;

$R_2$ represents hydrogen, a substituted or unsubstituted alkyl, alkenyl or alkynyl group, a substituted or unsubstituted allyl group, a substituted or unsubstituted aryl group, a substituted or unsubstituted heterocyclic group or polyoxyalkylene group, a substituted or unsubstituted carboxyalkyl group, a substituted or unsubstituted acyl, amido or sulfo group, or a substituted or unsubstituted alkoxy- or aryloxy-carbonyl group;

$R_3$ has a Pi of 0 to 1.5; and $R_4$ has a Pi of greater than or equal to 1.0.

2. The composition of claim 1 wherein $R_3$ has a Pi of 0.5 to 1.5.

3. The composition of claim 1 wherein $R_3$ represents hydrogen, a substituted or unsubstituted alkyl, alkenyl or alkynyl group, a substituted or unsubstituted allyl group, a substituted or unsubstituted aryl group, a substituted or unsubstituted heteroaryl group or polyoxyalkylene group, a substituted or unsubstituted carboxyalkyl group or carboxyaryl group, or a substituted or unsubstituted acyl or sulfo group.

4. The composition of claim 3 wherein $R_3$ represents an unsubstituted methyl, ethyl or propyl group, a substituted butyl or pentyl group, a substituted phenyl group, a substituted or unsubstituted pyridyl group, a substituted or unsubstituted methylcarboxyalkyl group, in which the alkyl group is between 1–3 carbons; a methylcarboxyphenyl group, a substituted or unsubstituted alkenyl or alkynyl group, in which the alkenyl group is from 2–4 carbons, or one of the following functional groups in which R is a substituted or unsubstituted alkyl or aryl group:

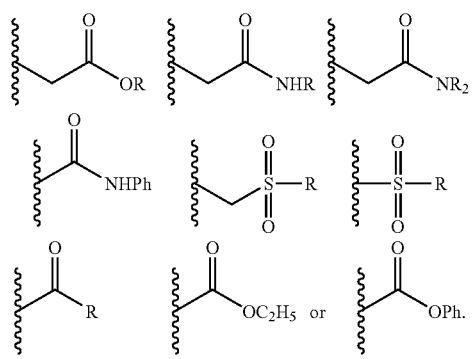

5. The composition of claim 1 wherein $R_4$ represents, halogen, a substituted or unsubstituted alkyl, alkenyl or alkynyl group, a substituted or unsubstituted allyl group, a substituted or unsubstituted aryl group, a substituted or unsubstituted heterocyclic group or polyoxyalkylene group; a substituted or unsubstituted alkoxy group, a substituted or unsubstituted aryloxy group, a substituted or unsubstituted alkoxy- or aryloxy-carbonyl group, a substituted or unsubstituted alkyl-, arylalkyl-, aryl-, diaryl- or dialkyl-carbamoyl group, a substituted or unsubstituted alkyl-, arylalkyl-, aryl-, diaryl- or dialkyl-sulfamoyl group, a substituted or unsubstituted alkyl-, aralkyl-, aryl-, diaryl- or dialkyl-amino group; a substituted or unsubstituted heteroalkyl group, or an acyl group.

6. The composition of claim 5 wherein $R_4$ represents a substituted or unsubstituted alkyl, alkenyl or alkynyl group, a substituted or unsubstituted allyl group, a substituted or unsubstituted aryl group, a substituted or unsubstituted heterocyclic group or a group having the following structure in which R is a substituted or unsubstituted alkyl, alkenyl or alkynyl group, a substituted or unsubstituted allyl group, a substituted or unsubstituted aryl group, or a substituted or unsubstituted heterocyclic group

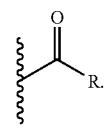

7. The composition of claim 1 wherein $R_1$ represents a substituted or unsubstituted alkyl, alkenyl or alkynyl group, a substituted or unsubstituted allyl group, a substituted or unsubstituted aryl group, a substituted or unsubstituted heterocyclic group or a group having the following structure in which R is a substituted or unsubstituted alkyl, alkenyl or alkynyl group, a substituted or unsubstituted allyl group, a substituted or unsubstituted aryl group, or a substituted or unsubstituted heterocyclic group

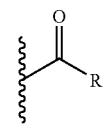

and wherein $R_2$ represents a substituted or unsubstituted alkyl, alkenyl or alkynyl group, a substituted or unsubstituted allyl group, a substituted or unsubstituted aryl group, a substituted or unsubstituted heterocyclic group or one of the following functional groups in which R is a substituted or unsubstituted alkyl or aryl group:

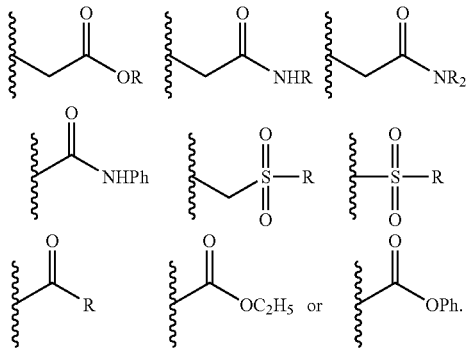

8. The ink composition of claim 1 wherein the co-stabilizer is clay, silica, an inorganic metal salt, hydroxide or oxide, a starch, a sulfonated cross-linked organic homopolymer, a resinous polymer or copolymer, hexadecane, cetyl alcohol, or any steric hydrophobic stabilizer.

9. The ink composition of claim 1 wherein the co-stabilizer is hexadecane, cetyl alcohol, or a steric hydrophobic stabilizer.

10. The ink composition of claim 1 wherein the water insoluble dye has a solubility of less than 1 g/L in aqueous media at 250° C.

11. The ink composition of claim 1 wherein the polymer-dye particles have an average particle size of less than 1 μm.

12. The ink composition of claim 1 wherein the polymer-dye particles have an average particle size of less than 200 nm.

13. The ink composition of claim 1 wherein the ratio of the colorant phase to the polymer phase is from about 10:90 to about 90:10.

14. The ink composition of claim 1 wherein the polymer-dye particles are made by a process comprising, in order:
I) forming a colorant mixture comprising a water insoluble dye of Formula (I) and an organic medium containing at least one ethylenically-unsaturated monomer;

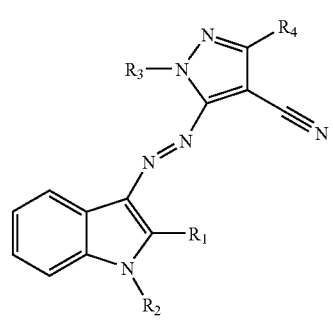

(I)

wherein $R_1$ represents hydrogen, halogen, a substituted or unsubstituted alkyl, alkenyl or alkynyl group, a substituted or unsubstituted allyl group, a substituted or unsubstituted aryl group, a substituted or unsubstituted heterocyclic group or polyoxyalkylene group; a cyano, carboxy, acyl, carboxyalkyl, nitro, sulfo, or amino group, a substituted or unsubstituted alkoxy group, a substituted or unsubstituted aryloxy group, a substituted or unsubstituted alkoxy- or aryloxy-carbonyl group, a ureido group, a carbamoyl group, a substituted or unsubstituted alkyl-, arylalkyl-, aryl-, diaryl- or dialkyl-carbamoyl group, a sulfamoyl group, a substituted or unsubstituted alkyl-, arylalkyl-, aryl-, diaryl- or dialkyl-sulfamoyl group, a sulfonyl group, an acylamino group, a sulfonylamino group, a substituted or unsubstituted alkyl-, aralkyl-, aryl-, diaryl- or dialkyl-amino group; a substituted or unsubstituted heteroalkyl group, or an acyl group;

$R_2$ represents hydrogen, a substituted or unsubstituted alkyl, alkenyl or alkynyl group, a substituted or unsubstituted allyl group, a substituted or unsubstituted aryl group, a substituted or unsubstituted heterocyclic group or polyoxyalkylene group, a substituted or unsubstituted carboxyalkyl group, a substituted or unsubstituted acyl, amido or sulfo group, or a substituted or unsubstituted alkoxy- or aryloxy-carbonyl group;

$R_3$ has a Pi of 0 to 1.5; and
$R_4$ has a Pi of greater than or equal to 1.0;
II) combining said colorant mixture with an aqueous mixture comprising a surfactant and a co-stabilizer to form a colorant mixture/aqueous mixture;
III) causing the colorant mixture/aqueous mixture to form a stable aqueous droplet mixture via strong agitation; and
IV) initiating polymerization to form composite polymer-dye particles comprising a colorant phase and a polymer phase;
wherein an addition polymerization initiator is added prior to initiating polymerization.

15. The composition of claim 14 wherein $R_3$ has a Pi of 0.5 to 1.5.

16. The composition of claim 14 wherein $R_3$ represents hydrogen, a substituted or unsubstituted alkyl, alkenyl or alkynyl group, a substituted or unsubstituted allyl group, a substituted or unsubstituted aryl group, a substituted or unsubstituted heteroaryl group or polyoxyalkylene group, a substituted or unsubstituted carboxyalkyl group or carboxyaryl group, or a substituted or unsubstituted acyl or sulfo group.

17. The composition of claim 16 wherein $R_3$ represents an unsubstituted methyl, ethyl or propyl group, a substituted butyl or pentyl group, a substituted phenyl group, a substituted or unsubstituted pyridyl group, a substituted or unsubstituted methylcarboxyalkyl group, in which the alkyl group is between 1–3 carbons; a methylcarboxyphenyl group, a substituted or unsubstituted alkenyl or alkynyl group, in which the alkenyl group is from 2–4 carbons, or one of the following functional groups in which R is a substituted or unsubstituted alkyl or aryl group:

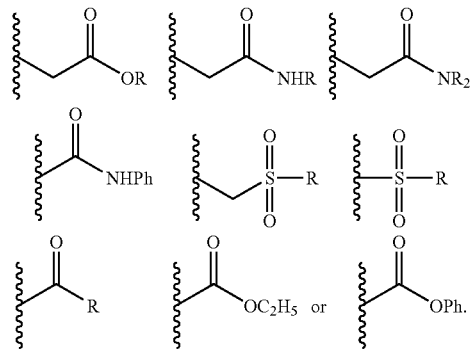

18. The composition of claim 14 wherein $R_4$ represents halogen, a substituted or unsubstituted alkyl, alkenyl or alkynyl group, a substituted or unsubstituted allyl group, a substituted or unsubstituted aryl group, a substituted or unsubstituted heterocyclic group or polyoxyalkylene group; a substituted or unsubstituted alkoxy group, a substituted or unsubstituted aryloxy group, a substituted or unsubstituted alkoxy- or aryloxy-carbonyl group, a substituted or unsubstituted alkyl-, arylalkyl-, aryl-, diaryl- or dialkyl-carbamoyl group, a substituted or unsubstituted alkyl-, arylalkyl-, aryl-, diaryl- or dialkyl-sulfamoyl group, a substituted or unsubstituted alkyl-, aralkyl-, aryl-, diaryl- or dialkyl-amino group; a substituted or unsubstituted heteroalkyl group, or an acyl group.

19. The composition of claim 18 wherein $R_4$ represents a substituted or unsubstituted alkyl, alkenyl or alkynyl group, a substituted or unsubstituted allyl group, a substituted or unsubstituted aryl group, a substituted or unsubstituted heterocyclic group or a group having the following structure in which R is a substituted or unsubstituted alkyl, alkenyl or alkynyl group, a substituted or unsubstituted allyl group, a substituted or unsubstituted aryl group, or a substituted or unsubstituted heterocyclic group

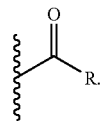

20. The composition of claim 14 wherein $R_1$ represents a substituted or unsubstituted alkyl, alkenyl or alkynyl group, a substituted or unsubstituted allyl group, a substituted or unsubstituted aryl group, a substituted or unsubstituted heterocyclic group or a group having the following structure in which R is a substituted or unsubstituted alkyl, alkenyl or alkynyl group, a substituted or unsubstituted allyl group, a substituted or unsubstituted aryl group, or a substituted or unsubstituted heterocyclic group

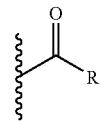

and $R_2$ represents a substituted or unsubstituted alkyl, alkenyl or alkynyl group, a substituted or unsubstituted allyl group, a substituted or unsubstituted aryl group, a substituted or unsubstituted heterocyclic group or one of the following functional groups in which R is a substituted or unsubstituted alkyl or aryl group:

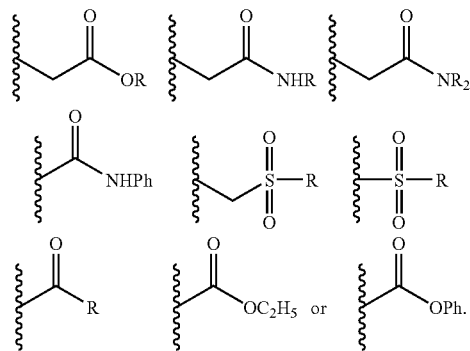

21. The ink composition of claim 14 wherein the co-stabilizer is clay, silica, an inorganic metal salt, hydroxide or oxide, a starch, a sulfonated cross-linked organic homopolymer, a resinous polymer or copolymer, hexadecane, cetyl alcohol, or any steric hydrophobic stabilizer.

22. The ink composition of claim 14 wherein the polymer is a homopolymer.

23. The ink composition of claim 14 wherein the polymer is a cross-linked polymer and the organic medium contains a mixture of ethylenically-unsaturated monomers comprising:
a) at least one ethylenically-unsaturated monomer being free of ionic charge groups and being capable of addition polymerization to form a substantially water-insoluble homopolymer; and
b) at least one ethylenically-unsaturated monomer capable of being a cross-linker.

24. The ink composition of claim 14 wherein the polymer is a copolymer containing at least one ethylenically-unsaturated monomer being free of ionic charge groups and being capable of addition polymerization to form a substantially water-insoluble homopolymer.

25. The ink composition of claim 14 wherein the water insoluble dye has a solubility of less than 1 g/L in aqueous media at 25° C.

26. The ink composition of claim 14 wherein the polymer-dye particles have an average particle size of less than 1 µm.

27. The ink composition of claim 14 wherein the polymer-dye particles have an average size of less than about 200 nm.

28. The ink composition of claim 14 wherein the ratio of the colorant phase to the polymer phase is from about 10:90 to about 90:10.

29. An ink jet printing method, comprising the steps of:
A) providing an ink jet printer that is responsive to digital data signals;
B) loading said printer with an ink jet recording element comprising a support having thereon an image-receiving layer;
C) loading said printer with an ink jet ink composition comprising water, a humectant, and polymer-dye particles, wherein said polymer-dye particles comprise a colorant phase containing a water insoluble dye of formula (I), and a polymer phase, said phases having an interface between them, and said particles being associated with a co-stabilizer; and

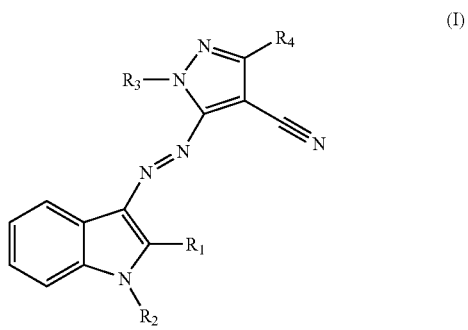

(I)

wherein $R_1$ represents hydrogen, halogen, a substituted or unsubstituted alkyl, alkenyl or alkynyl group, a substituted or unsubstituted allyl group, a substituted or unsubstituted aryl group, a substituted or unsubstituted heterocyclic group or polyoxyalkylene group; a cyano, carboxy, acyl, carboxyalkyl, nitro, sulfo, or amino group, a substituted or unsubstituted alkoxy group, a substituted or unsubstituted aryloxy group, a substituted or unsubstituted alkoxy- or aryloxy-carbonyl group, a ureido group, a carbamoyl group, a substituted or unsubstituted alkyl-, arylalkyl-, aryl-, diaryl- or dialkyl-carbamoyl group, a sulfamoyl group, a substituted or unsubstituted alkyl-, arylalkyl-, aryl-, diaryl- or dialkyl-sulfamoyl group, a sulfonyl group, an acylamino group, a sulfonylamino group, a substituted or unsubstituted alkyl-, aralkyl-, aryl-, diaryl- or dialkyl-amino group; a substituted or unsubstituted heteroalkyl group, or an acyl group;

R₂ represents hydrogen, a substituted or unsubstituted alkyl, alkenyl or alkynyl group, a substituted or unsubstituted allyl group, a substituted or unsubstituted aryl group, a substituted or unsubstituted heterocyclic group or polyoxyalkylene group, a substituted or unsubstituted carboxyalkyl group, a substituted or unsubstituted acyl, amido or sulfo group, or a substituted or unsubstituted alkoxy- or aryloxy-carbonyl group;

R₃ has a Pi of 0 to 1.5; and

R₄ has a Pi of greater than or equal to 1.0;

D) printing on said image-receiving layer using said ink jet ink composition in response to said digital data signals.

30. The ink jet printing method of claim 29 wherein the polymer-dye particles are made by a process comprising, in order:

I) forming a colorant mixture comprising the water insoluble dye of formula (I) and an organic medium containing at least one ethylenically-unsaturated monomer;

II) combining said colorant mixture with an aqueous mixture comprising a surfactant and a co-stabilizer to form a colorant mixture/aqueous mixture;

III) causing the colorant mixture/aqueous mixture to form a stable aqueous droplet mixture via strong agitation; and IV) initiating polymerization to form composite polymer-dye particles comprising a colorant phase and a polymer phase;

wherein an addition polymerization initiator is added prior to initiating polymerization.

31. The method of claim 29 wherein R₃ has a Pi of 0.5 to 1.5.

32. The method of claim 29 wherein R₃ represents hydrogen, a substituted or unsubstituted alkyl, alkenyl or alkynyl group, a substituted or unsubstituted allyl group, a substituted or unsubstituted aryl group, a substituted or unsubstituted heteroaryl group or polyoxyalkylene group, a substituted or unsubstituted carboxyalkyl group or carboxyaryl group, or a substituted or unsubstituted acyl or sulfo group.

33. The method of claim 32 wherein R₃ represents an unsubstituted methyl, ethyl or propyl group, a substituted butyl or pentyl group, a substituted phenyl group, a substituted or unsubstituted pyridyl group, a substituted or unsubstituted methylcarboxyalkyl group, in which the alkyl group is between 1–3 carbons; a methylcarboxyphenyl group, a substituted or unsubstituted alkenyl or alkynyl group, in which the alkenyl group is from 2–4 carbons, or one of the following functional groups in which R is a substituted or unsubstituted alkyl or aryl group:

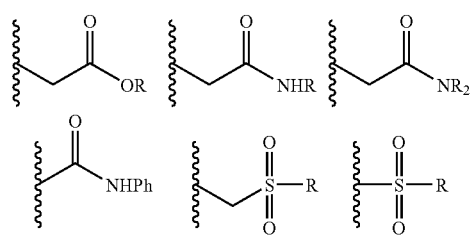

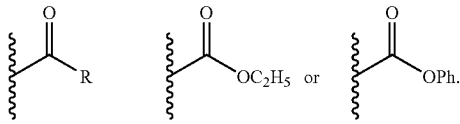

34. The method of claim 29 wherein R₄ represents, halogen, a substituted or unsubstituted alkyl, alkenyl or alkynyl group, a substituted or unsubstituted allyl group, a substituted or unsubstituted aryl group, a substituted or unsubstituted heterocyclic group or polyoxyalkylene group; a substituted or unsubstituted alkoxy group, a substituted or unsubstituted aryloxy group, a substituted or unsubstituted alkoxy- or aryloxy-carbonyl group, a substituted or unsubstituted alkyl-, arylalkyl-, aryl-, diaryl- or dialkyl-carbamoyl group, a substituted or unsubstituted alkyl-, arylalkyl-, aryl-, diaryl- or dialkyl-sulfamoyl group, a substituted or unsubstituted alkyl-, aralkyl-, aryl-, diaryl- or dialkyl-amino group; a substituted or unsubstituted heteroalkyl group, or an acyl group.

35. The method of claim 34 wherein R₄ represents a substituted or unsubstituted alkyl, alkenyl or alkynyl group, a substituted or unsubstituted allyl group, a substituted or unsubstituted aryl group, a substituted or unsubstituted heterocyclic group or a group having the following structure in which R is a substituted or unsubstituted alkyl, alkenyl or alkynyl group, a substituted or unsubstituted allyl group, a substituted or unsubstituted aryl group, or a substituted or unsubstituted heterocyclic group

36. The method of claim 29 wherein R₁ represents a substituted or unsubstituted alkyl, alkenyl or alkynyl group, a substituted or unsubstituted allyl group, a substituted or unsubstituted aryl group, a substituted or unsubstituted heterocyclic group or a group having the following structure in which R is a substituted or unsubstituted alkyl, alkenyl or alkynyl group, a substituted or unsubstituted allyl group, a substituted or unsubstituted aryl group, or a substituted or unsubstituted heterocyclic group

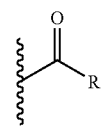

and R₂ represents a substituted or unsubstituted alkyl, alkenyl or alkynyl group, a substituted or unsubstituted allyl group, a substituted or unsubstituted aryl group, a substituted or unsubstituted heterocyclic group or one of the following functional groups in which R is a substituted or unsubstituted alkyl or aryl group:

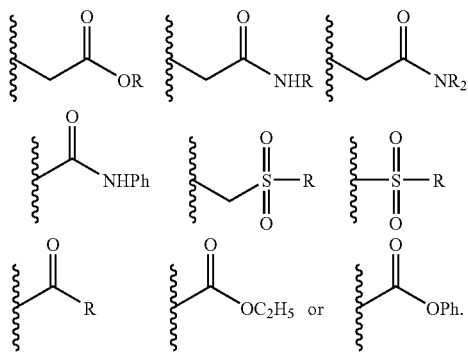

37. An ink composition comprising water, a humectant, and polymer-dye particles, wherein said polymer-dye particles comprise a colorant phase containing a water insoluble dye of formula (I), and a polymer phase, said particles being associated with a hexadecane, cetyl alcohol, or a steric hydrophobic stabilizer co-stabilizer

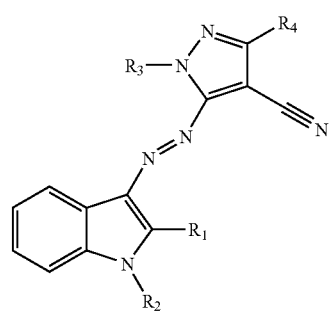

(I)

wherein $R_1$ represents hydrogen, halogen, a substituted or unsubstituted alkyl, alkenyl or alkynyl group, a substituted or unsubstituted allyl group, a substituted or unsubstituted aryl group, a substituted or unsubstituted heterocyclic group or polyoxyalkylene group; a cyano, carboxy, acyl, carboxyalkyl, nitro, sulfo, or amino group, a substituted or unsubstituted alkoxy group, a substituted or unsubstituted aryloxy group, a substituted or unsubstituted alkoxy- or aryloxy-carbonyl group, a ureido group, a carbamoyl group, a substituted or unsubstituted alkyl-, arylalkyl-, aryl-, diaryl- or dialkyl-carbamoyl group, a sulfamoyl group, a substituted or unsubstituted alkyl-, arylalkyl-, aryl-, diaryl- or dialkyl-sulfamoyl group, a sulfonyl group, an acylamino group, a sulfonylamino group, a substituted or unsubstituted alkyl-, aralkyl-, aryl-, diaryl- or dialkyl-amino group; a substituted or unsubstituted heteroalkyl group, or an acyl group;

$R_2$ represents hydrogen, a substituted or unsubstituted alkyl, alkenyl or alkynyl group, a substituted or unsubstituted allyl group, a substituted or unsubstituted aryl group, a substituted or unsubstituted heterocyclic group or polyoxyalkylene group, a substituted or unsubstituted carboxyalkyl group, a substituted or unsubstituted acyl, amido or sulfo group, or a substituted or unsubstituted alkoxy- or aryloxy-carbonyl group;

$R_3$ has a Pi of 0 to 1.5; and $R_4$ has a Pi of greater than or equal to 1.0.

* * * * *

UNITED STATES PATENT AND TRADEMARK OFFICE
CERTIFICATE OF CORRECTION

PATENT NO.         : 7,160,933 B2                                      Page 1 of 1
APPLICATION NO.    : 10/393061
DATED              : January 9, 2007
INVENTOR(S)        : Joan C. Potenza et al.

It is certified that error appears in the above-identified patent and that said Letters Patent is hereby corrected as shown below:

| | |
|---|---|
| Column 27, Line 11, Claim 11 | In Claim 10, delete "250°" and insert -- 25° --, therefor. |
| Column 28, Line 1, Claim 1 | In Claim 14, delete "0to 1.5;and" and insert -- 0 to 1.5; and-- |
| Column 28, Line 9, Claim 14 | In Claim 14, after "form" delete "composite". |
| Column 31, Line 30, Claim 30 | In Claim 30, after "form" delete "composite". |

Signed and Sealed this

Third Day of July, 2007

JON W. DUDAS
*Director of the United States Patent and Trademark Office*